US007397025B2

(12) United States Patent
Baba et al.

(10) Patent No.: US 7,397,025 B2
(45) Date of Patent: Jul. 8, 2008

(54) MASS SPECTROMETER

(75) Inventors: Takashi Baba, Kawagoe (JP); Hiroyuki Satake, Kokubunji (JP); Yasuaki Takada, Kiyose (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1 day.

(21) Appl. No.: 11/517,334

(22) Filed: Sep. 8, 2006

(65) Prior Publication Data

US 2007/0023648 A1 Feb. 1, 2007

Related U.S. Application Data

(63) Continuation of application No. 11/126,218, filed on May 11, 2005, now Pat. No. 7,129,478.

(30) Foreign Application Priority Data

May 24, 2004 (JP) ............................ 2004-152835

(51) Int. Cl.
*B01D 59/44* (2006.01)
*H01J 49/00* (2006.01)

(52) U.S. Cl. ....................... 250/281; 250/288; 250/291; 250/292

(58) Field of Classification Search ....................... None
See application file for complete search history.

(56) References Cited

U.S. PATENT DOCUMENTS 5,420,425 A 5/1995 Bier et al.
5,493,115 A 2/1996 Deinzer et al.
5,783,824 A 7/1998 Baba et al.
5,847,386 A 12/1998 Thomson et al.
6,177,668 B1 1/2001 Hager
6,852,970 B2 2/2005 Yamada et al.
6,919,562 B1 7/2005 Whitehouse et al.
7,129,478 B2 * 10/2006 Baba et al. .................. 250/281

FOREIGN PATENT DOCUMENTS

JP 6-96727 5/1993
JP 9-306419 5/1996

* cited by examiner

*Primary Examiner*—Nikita Wells
*Assistant Examiner*—James J Leybourne
(74) *Attorney, Agent, or Firm*—Reed Smith LLP; Stanley P. Fisher, Esq.; Juan Carlos A. Marquez, Esq.

(57) ABSTRACT

A mass spectrometer having an ion source section capable of creating positive ions and negative ions at high efficiency. The ion source is comprised of an ion source section for creating ions of a sample gas, a mass spectrometric section for conducting mass separation of created ions, linear RF generating multipole electrodes, magnetic fields generation means, a sample gas introduction system, a reaction gas introduction system and an electron source in which the linear RF generating multipole electrodes generate linear RF multipole electric fields. A static magnetic fields is applied in parallel on the center axis where the linear RF multipole electric fields are zero. A sample gas and a reagent gas are introduced into the ion source section. Electrons are injected for creating reaction of the positive ions or negative ions.

1 Claim, 10 Drawing Sheets

MASS SPECTROMETER

CROSS-REFERENCE TO RELATED APPLICATION

This application is a Continuation application of U.S. application Ser. No. 11/126,218 filed May 11, 2005 now U.S. Pat. No. 7,129,478. Priority is claimed based on U.S. application Ser. No. 11/126,218 filed May 11, 2005, which claims the priority of Japanese Patent Application No. 2004-152835 filed on May 24, 2004, all of which is incorporated by reference.

BACKGROUND OF THE INVENTION

The present invention concerns a mass spectrometry and, particularly, it relates to a massspectrometer that can be utilized, for example, for the detection of contaminants such as residual agricultural chemicals present by slight amount in atmospheric air, drinking water, foods, etc. or detection of dangerous matters.

Mass spectrometry is an essential technique as means for identifying substances and has been utilized generally for application uses such as detection of environmental food contaminants present by slight amount in atmospheric air, drinking water, foods, etc., or detection of dangerous matters.

In mass spectrometry, molecular samples separated from specimen by using an appropriate pretreatment device such as a gas chromatograph are introduced in vacuum and ionized and created as sample ions. The sample ions are identified by measuring for the ratio of charge and mass (charge-mass ratio) by using electro magnetic fields in a mass spectrometric section. Various kinds of pretreatment devices, ions sources and mass spectrometers have been known and identification of substances is conducted in a wide range of fields by appropriately selecting and combining them while utilizing the feature coping with the object to be analyzed.

The chemical ionization includes, as is well-known, positive chemical ionization for creating positive ions and negative chemical ionization for creating negative ions. In many cases, a sample gas separated by a pretreatment device such as a gas chromatograph is introduced in vacuum, ions are created by chemical ionizing reaction and they are analyzed by an ion trap mass spectrometer, etc.

In the positive chemical ionization, when an electron $e^-$ at high energy (about 70 eV) is irradiated to molecule species G referred to as a reagent gas, a primary positive ion $G^+$ is created by the process of electron impact between the reagent gas and the electron (electron impact ionizing reaction of formula (1)) and a positive sample ion $M^+$ is created by the transfer of a positive charge from the primary positive ion $G^+$ to the sample gas molecule M (charge transfer reaction of formula (2)). The created positive sample ion $M^+$ is subjected to mass analysis is identified. In the positive chemical ionization, methane ($CH_4$), etc. are utilized generally as the reagent gas of molecule species G.

$$G+e^-(\text{several tens eV})\rightarrow G^++2e^- \quad (1)$$

$$G^++M\rightarrow G+M^+ \quad (2)$$

On the other hand, in the negative chemical ionization, when an electron $e^-$ at low speed (1 eV or lower) is irradiated to the reagent gas of molecule species G, a primary negative ion $G^-$ ions are created by the electron capture process by the reagent gas molecule species G (electron capture reaction of formula (3)) and a negative sample ion $M^-$ is created by electron donation and reception between the created primary negative ion $G^-$ and the sample molecule M (charge transfer reaction of formula (4)). In the negative chemical ionization, molecule of water, etc. are utilized generally as the reagent gas molecule species G.

$$G+e^-(1\text{ eV or lower})\rightarrow G^- \quad (3)$$

$$G^++M\rightarrow G+M^+ \quad (4)$$

In a case of conducting creation of the sample ions and the mass analysis of the sample ions in different places, it requires an ion transportation section for ion transportation between the ion source section and the mass spectrometric section. This results in loss of the sample ions caused by ion transportation. On the other hand, in a case of conducting creation of the sample ions and mass analysis of the sample ions in one identical place, that is, in a mass spectrometer in which the ion source section and the mass spectrometric section are identical, loss of the sample ions is not caused, and mass spectrometry at high efficiency is possible.

A mass spectrometer having an ion source section for conducting positive chemical ionization is well-known (for example, refer to Japanese Patent Application Laid-Open No. 6-96727). The positive chemical ionization is often conducted inside the ion trap.

FIG. 9 is a view for explaining the outline of a mass spectrometer in a prior art where an ion source section for conducting positive chemical ionization and a mass spectrometric section are used in common.

A three dimensional ion trap comprises a ring electrode 201, and two end cap electrodes 202 and 203. When a reagent gas used for positive chemical ionization (flow of reagent gas is shown by arrow 205) and a sample gas containing a sample molecules separated by gas chromatograph (GC) 206 (flow of sample gas is shown by arrow 207) are introduced to a vacuum vessel where the three dimensional ion trap is placed. Thermal electrons generated by a tungsten filament 204 are accelerated and have a kinetic energy at about 70 eV. The accelerated thermal electrons are introduced as an electron beam 208 to the inside of the three dimensional ion trap.

$G^+$ is created by there action of formula (1) between the electron and the reagent gas molecule G introduced to the inside of the three dimensional ion trap and the created $G^+$ is reacted with the specimen gas molecule M (formula (2)) to create the sample ion $M^+$ 209. The created sample ion $M^+$ 209 is ejected mass selectively from the three dimensional ion trap by using a well-known three dimensional ion trap mass spectrometry and detected by an ion detector 210. The sample molecule is identified based on mass spectra.

A mass spectrometer having an ion source section for conducting negative chemical ionization is well-known (for example, refer to Japanese Patent Application Laid-Open No. 9-306419). In the prior art, creation of negative sample ions and separative detection of the sample ions are conducted generally in different places, that is, the ion source section and the mass spectrometric section are placed independently of each other. The ion source section is often referred to as an external ion source. Negative sample ions created by the external ion source are introduced into the mass spectrometric section. In the prior art, creation of the sample ion by the negative chemical ionization in the ion trap has been utilized only limitatively such as for scientific researches since the reaction efficiency of the formula (3) is low.

FIG. 10 is a view for explaining the outline of a mass spectrometer in the prior art having an external ion source section for conducting negative chemical ionization.

As shown in FIG. 10, an ion trap mass spectrometric section in which a three dimensional ion trap comprising a ring electrode 201 and two end cap electrodes 202 and 203 is placed, and an external ion source vessel 301 for conducting negative ionization of a sample are placed independently of each other. A reagent gas used for negative chemical ionization (flow of reagent gas is shown by arrow 205) and a gas containing a sample separated by a gas chromatograph 206 (gas flow containing sample is shown by arrow 207) are introduced into an external ion source 301. Thermal electrons generated by a tungsten filament 204 are introduced as an electron beam 208 at a low energy to the external ion source vessel 301.

$G^-$ is created by the reaction between the electron and the reagent gas molecule G introduced to the inside of the external ion source vessel 301 (formula 3) and the created $G^-$ is reacted with the sample gas molecule M (formula 4) to create a sample ion $M^-$ 302. The created sample ion $M^-$ 302 is moved from the external ion source vessel 301 through diffusion to the three dimensional ion trap as shown by a horizontal arrow shown in FIG. 10. The sample ion $M^-$ 302 is ejected mass selectively from the three dimensional ion trap by using a well-known dimensional ion trap mass spectrometry and detected by an ion detector 210. The sample molecule is identified based on the detection signal by the ion detector 210.

A linear ion trap mass spectrometric system is well-known (refer, for example, to the specification of U.S. Pat. No. 5,420,425 and the specification of U.S. Pat. No. 6,177,668), the technique regarding a linear ion trap axial resonance ejection on the linear ion trap mass spectrometry is well-known (refer, for example, to the specification of U.S. Pat. No. 5,783,824). An ion guiding technique using linear RF generating multipole electrodes not in parallel is well-known (refer, for example, to the specification of U.S. Pat. No. 5,847,386).

SUMMARY OF THE INVENTION

Since the external ion source described above has no ion focusing function and ions are diffused, the ratio of sample ions that can be utilized for the introduction to the mass spectrometric section is low. Owing to this, it involves a problem that no high sensitivity can be obtained in the method of using the negative chemical ionization as compared with the method of using the positive chemical ionization as pointed out so far.

A method of conducting the negative chemical ionization inside the ion trap at a high efficiency identical with that in a case of conducting positive ionization inside the ion trap has not yet been known at present. Even when the low energy electrons are intended to be introduced to the inside of the ion trap by the same method as in the case of conducting the positive chemical ionization, since the low energy electrons are oscillated and heated by the ion trap RF electric fields, it was difficult to transport electrons at a kinetic energy of 1 eV or lower that is necessary for the negative ionization reaction as far as the center of the ion trap. Accordingly, even when the negative chemical ionization can be conducted in the inside of the ion trap, the negative ions can be created only at an extremely low efficiency.

The present invention intends to provide a mass spectrometer having an ion source section capable of creating positive ions and negative ions at a high efficiency and capable of detecting ions at a high sensitivity.

For attaining the foregoing object, the mass spectrometer according to the invention comprises an ion source section for creating ions of a sample gas, a mass spectrometric section for conducting mass analysis of the created ions, linear RF generating multipole electrodes, magnetic field generation means, a sample gas introduction system, a reaction gas (reagent gas) introduction system and an electron source. The linear RF generating multipole electrodes generate a linear RF multipole electric field. As the magnetic field generation means, a permanent magnet or an electromagnet is used, and the magnetic field generation means generate static magnetic fields to be superimposed substantially in parallel on a center axis where the linear RF multipole electric fields are substantially at zero. The sample gas introduction system introduces the sample gas to the ion source section. The reaction gas introduction system introduces a reaction gas (reagent gas) used for creating positive ions or negative ions to the inside of the ion source. The electron source generates electrons used for the creating reaction of the positive ions or the negative ions. The linear RF generating multipole electrodes, the magnetic field generation means and the electron source are disposed inside the ion source. The ion source and the mass spectrometric section are arranged in an evacuated region.

Respective features of the mass spectrometer are to be described below.

(1) The ion transportation section for transporting the created ions to the mass spectrometric section is provided between the ion source section and the mass spectrometric section.

(2) The value obtained by subtracting a DC voltage to be superimposed on the linear RF generating multipole electrodes from the DC voltage applied to the electron source in a case of creating negative ions of the sample gas is set to 1 V or lower.

(3) The value obtained by subtracting a DC voltage superimposed on the linear RF generating multipole electrodes from the DC voltage applied to the electron source in a case of creating positive ions of the sample gas is set to 20 V or higher.

(4) The magnetic flux density of the static magnetic fields is set to 10 m tesla or more.

(5) An electron passing electrode having an aperture for allowing electrons to pass therethrough is disposed between the electron source and the linear RF generating multipole electrodes, and a voltage can be applied controllably to the electron passing electrode. A DC voltage within ±1 V relative to the DC voltage superimposed on the linear RF generating multipole electrode is applied to the electron passing electrode in a case of creating negative ions of the sample gas. Further a negative DC potential higher than the DC potential superimposed on the linear RF generating multipole electrode is applied to the electron passing electrode in a case of introducing the negative ions of the sample gas to the mass spectrometric section.

(6) An amplitude of the RF voltage applied to the linear RF generating multipole electrodes is set so as to converge ions at a charge-mass ratio of 10 or more.

(7) The DC potential of the electron source relative to the DC potential of the mass spectrometric section is set to 20 V or lower in a case of creating the negative ions of the sample gas, or the difference of the DC voltage to be superimposed on the linear RF generating multipole electrodes relative to the DC potential of the mass spectrometric section is set to 20 V or lower in a case of creating the negative ions of the sample gas.

(8) The mass spectrometric section is one of a three dimensional ion trap mass spectrometer, a linear ion trap mass spectrometer, a quadrupole filter mass spectrometer, a magnetic sector mass spectrometer, a time-of-flight mass spectrometer, and a Fourier transform ion cyclotron resonance mass spectrometer.

(9) The ion transportation section is an ion guide using an ion converging electrostatic lens or RF electric fields, or an ion guide applied with RF electric fields having an ion converging function and causing collision between the gas and the ions.

(10) The linear RF multipole electric fields are electric fields containing linear RF quadrupole electric fields as a main component, or containing linear RF hexapole electric fields or octapole RF electric fields as a main component.

(11) The intensity of the linear RF multipole electric fields is provided with a gradient in the direction of the center axis.

The mass spectrometer according to the invention is to be described briefly. After controlling the energy of electrons generated by the electron source to 1 eV or lower, the electrons are twined around the static magnetic fields and electrons are introduced into the linear RF quadrupole electric fields formed by linear RF generating multipole electrodes and negative chemical ionization is conducted within the linear converging potential of the linear RF quadrupole electric fields. The created negative ions of the sample are converged through a lens or the like and introduced at a high efficiency to the mass spectrometric section. As a result, a mass spectrometer having a negative chemical ion source section of a high efficiency and capable of detecting negative ions at a high sensitivity can be attained. This can improve the detection efficiency for molecule species such as explosives, for example, TNT or RDX, or agricultural chemicals which are difficult for positive ionization and tended to be put to negative ionization. Further, by setting the DC bias to be applied to the electron source and the DC bias to be applied to each of the electrodes of the ion source while changing them in correspondence to the creation and detection of positive ions and negative ions, creation and detection for the positive ions and the negative ions can be switched easily.

According to the present invention, a mass spectrometer of a high sensitivity having an ion source section capable of creating negative ions at a high efficiency can be attained.

DETAILED DESCRIPTION OF THE PREFERRED EMBODIMENTS

Embodiments of the present invention are to be described specifically with reference to the drawings.

Embodiment 1

Figure 1:
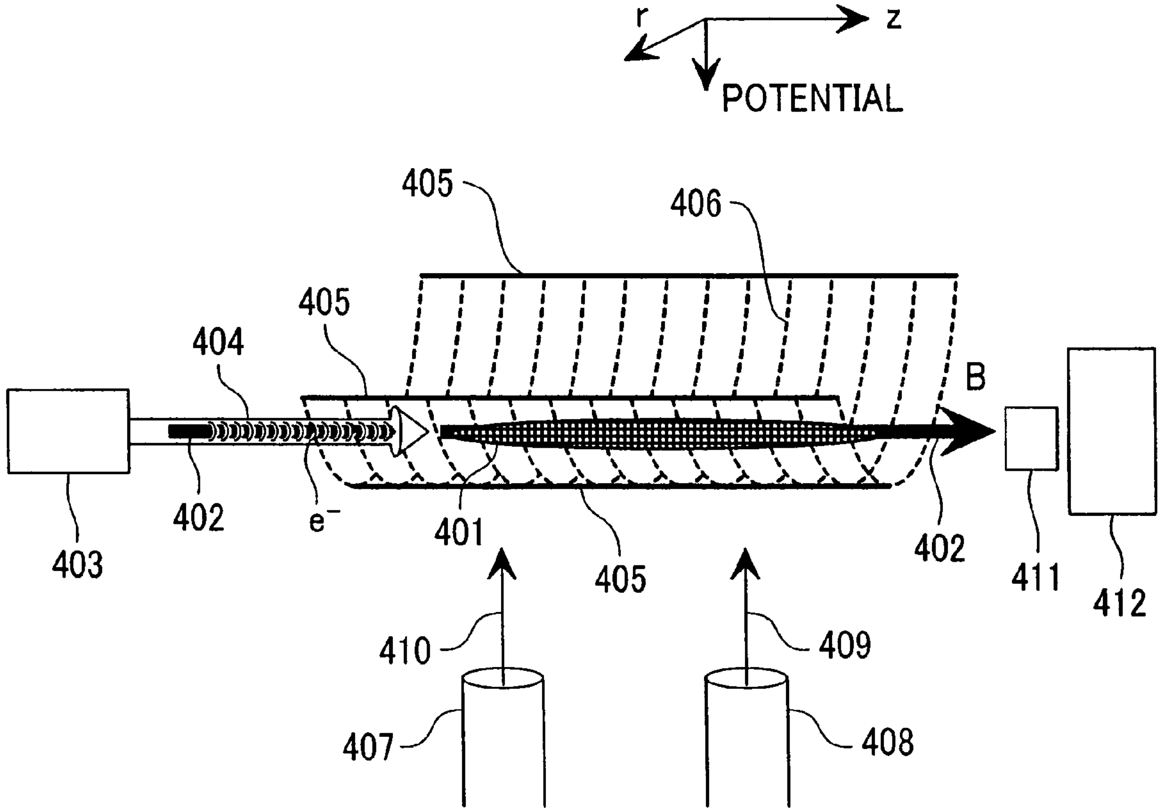
FIG. 1 is a view for explaining a main constitution of a mass spectrometer of Embodiment 1 according to the present invention.

FIG. 1 is a view for explaining a main constitution of a mass spectrometer according to Embodiment 1 of the invention. Constitution and function of elements shown in FIG. 1 are to be described.

A linear ion trap potential 406 shown by plural broken lines is formed of linear RF multipole electric fields formed in the direction r perpendicular to the direction z. A static magnetic field 402 indicated by a solid arrow in the horizontal direction is superimposed in parallel or substantially in parallel on a center axis where the linear RF multipole electric fields are substantially at 0 and shown by a static magnetic field intensity B. In the direction along with the center axis of a linear converging potential 406 (direction z), a gradient (electric field gradient) for the DC potential 405 shown by a solid line is not formed.

A sample gas is introduced from a sample gas introduction pipe 408 as a portion of a sample gas introduction system is introduced to the inside of a vacuum vessel (flow of sample gas is shown by an arrow 409). A reaction gas (reagent gas) used for the ion creating reaction is introduced from a reagent gas introduction pipe 407 as a portion of a gas introduction system to the inside of a vacuum vessel (flow of reagent gas is shown by an arrow 410). Electrons generated by an electron source 403 are introduced as an electron beam 404 shown by a blank arrow to the inside of the vacuum vessel for use in the ion creating reaction. Primary negative or positive ions created respectively by electron capture or electron impact of the reagent gas and sample ions 401 created by ion creating reaction of sample molecules by the primary ions are stored by a linear ion trap potential 406 along the center axis (z axis). The sample ions 401 are transported by an ion transportation section 411 to a mass spectrometric section 412.

The linear ion trap potential 406 of ions created by the linear RF multipole electric fields is known as a pseudo potential in the theory of ion trap mass spectrometry. That is, the pseudo potential is described as a time-averaged potential when RF multipole electric fields exert on charged particles. The linear RF multipole electric field is an electric field formed inside the electrodes by applying an RF voltage to the linear multipole electrodes. The linear multipole electrode has a quadrupole structure, hexapole structure, octapole structure, etc., in which rod-shape electrodes are arranged by four, six, eight, etc. In Embodiment 1 of the invention, the number of electrodes can be selected optionally. The quadrupole structure has a feature of easy manufacture since the number of rods is smaller compared with other structures. However, since the potential by the RF quadrupole electric fields has a property of making ions with small charge-mass ratio instable, when the charge-mass ratio of reagent gas ions (primary ions) or sample ions is large or when the charge-mass ratio of plural sample ions is large, the quadrupole structure can not sometimes cope with such case. Use of the hexa or more-pole electrode structure with no instability is effective for such a case.

As the electron source 403, a well-known tungsten filament, thorium-doped tungsten (thoria) filament, etc. are used. The tungsten filament is used in general chemical ionization and it is useful since electrons can be emitted at a low vacuum degree. Electrons generated from the electron source 403 are entered as the electron beam 404 along the center axis of the ion trapping potential 406, that is, along a line giving a minimum potential value. This can avoid heating of electrons due to RF electric fields.

Further, in Embodiment 1 of the invention, static magnetic field 402 is applied being formed in parallel or substantially in parallel with the center axis of the converging potential 406. Since electrons of the electron beam 404 move spiral around the magnetic force line by the static magnetic field 402, the electrons proceed along the center axis of the ion trapping potential 406. Due to the effect, heating of electrons by RF waves can be avoided. In this way, highly efficient progress of low energy electrons inside the RF electric field is possible.

In Embodiment 1 and each of the embodiments of the invention to be described later, the kinetic energy of electrons utilized for chemical ionization is controlled by the difference (potential difference) between the DC potential of the electron source 403 and the DC potential (static potential) 405 of the ion trapping potential 406.

In a case of creating sample ions by negative chemical ionization, the DC potential of the electron source 403 is higher than the DC potential 405 of the converging potential 406 and the potential difference is set to 1 V or lower. This enables to introduce the lower energy electrons necessary for the negative chemical ionization to the inside of the converging potential 406. That is, in a case of creating negative ions of the sample gas, it is set such that a value obtained by subtracting a DC (static) voltage superimposed on the linear RF multipole electric field from the DC (static) voltage applied to the electron source is 1 V or lower.

In a case of creating sample ions by positive chemical ionization, the DC potential of the electron source 403 is set higher than the DC potential 405 of the converging potential 406 and the potential difference is set to 20 V or higher and typically, at about 70 V. This enables to introduce the low energy electrons necessary for the positive chemical ionization to the inside of the ion trap potential 406. That is, in a case of creating the positive ions of the sample gas, it is set such that the value obtained by subtracting a DC (static) voltage superimposed on the liner RF multipole electric field from the DC (static) voltage applied to the electron source is 20 V or higher.

For restricting the electron orbit by the static magnetic field 402 on the center axis of the converging potential 406, it is necessary to set the magnetic flux density of the static magnetic field 402 to 10 mT or more. The constitution for generating the static magnetic field 402 effectively in Embodiment 1 and each of the embodiments of the invention to be described later is to be described later.

According to the reactions shown by formula (1) or (3), electron $e^-$ of the electron 404 introduced in the converging potential 406 reacts with a reagent gas molecule G to create a primary ion $G^+$ or $G^-$. The primary ion $G^+$ or $G^-$ is trapped by the trapping potential 406 to the center axis of the potential. Further, according to the reactions shown by formula (2) or (4), the primary ion $G^+$ or $G^-$ reacts with the molecule M of the sample gas 409 introduced in the trapping potential 406 to create the sample ion $M^+$ or $M^-$ 401. The sample ion $M^+$ or $M^-$ 401 are also stored by the trapping potential 406 to the center axis.

The created sample ion $M^+$ or $M^-$ 401 is introduced by way of the ion transportation section 411 to a mass spectrometric section 412 and put to mass spectrometry. The mass spectrometric section 412 is one of spectrometers such as a three dimensional ion trap spectrometer, a linear ion trap mass spectrometer, a quadrupole filter mass spectrometer, a magnetic sector mass spectrometer, a time-of-flight mass spectrometer, a Fourier transform ion cyclotron resonance mass spectrometer, etc. Ions created in the ion source section are introduced into the mass spectrometer by optionally using an ion transportation section 411 disposed between the ion source section for creating the sample ion 401 and the mass spectrometric section.

The ion transportation section 411 is any one of an aperture directly connecting the ion source section and the mass spectrometric section in series, a differential pumping section, an ion focusing electrostatic lens, an ion guide using an RF electric field or an ion guide for conducting collision between the ion and the gas and provided with the ion focusing function by the RF electric field which is placed between the ion source section and the mass spectrometric section. Since various kinds of ion source sections kept at a low vacuum and mass spectrometric sections kept at high vacuum have been known, they are not described specifically.

Embodiment 2 of the invention to be described later shows an example of a mass spectrometer using a three dimensional ion trap mass spectrometer. Since it is considered that the linear ion trap mass spectrometer based on mature techniques in recent years is effective for enhancing the sensitivity, an example of the mass spectrometer using the linear ion trap mass spectrometer is to be described in Embodiment 3 to be described later.

As shown in FIG. 1, since the DC potential 405 has no gradient (electric field gradient), it is highly plausible that 50% of the sample ions is introduced into the mass spectrometric section 412, while remaining 50% of them moves to the electron source 403 and lost in probabilistic point of view. That is, the utilization efficiency for the created sample ion is 50%.

Since Embodiment 2 of the invention to be described later has a constitution of not providing the electric field gradient in the direction of the center axis where the linear converging potential formed by the linear RF multipole electric field is substantially at 0, the efficiency of utilizing the created samples ions is 50%.

Since the Embodiment 3 of the invention to be described later has a constitution of providing the electric field gradient in the direction of the center axis where the linear converging potential formed by the linear RF multipole field is substantially at 0, that is, a constitution of improving the efficiency of transporting the sample ions on the side where the mass spectrometric section is situated not in the direction where the electron source is situated, this enables negative chemical ion ionization mass spectrometry at high sensitivity.

While Embodiment 2 of the invention to be described later is inferior to Embodiment 3 of the invention to be described later, since it has a simple constitution of apparatus, it is advantageous in view of a reduced cost.

(Explanation for the Constitution of Generating Static Magnetic Field)

FIG. 2, FIG. 3, FIG. 4, and FIG. 5 are, respectively, views for explaining first, second, third, and fourth examples of the constitution of the ion source section for creating positive or negative ions in Embodiment 1 and each of the embodiments of the invention. The ion source section comprises at least linear multipole electrodes for forming a linear RF multipole electric field in the direction r in perpendicular to the direction z, a magnet for generating a magnetic field in the direction z, a magnetic body constituting a magnetic circuit and an insulator for electric insulation.

Each of FIG. 2, FIG. 3, FIG. 4 and FIG. 5 is a cross sectional view including the center axis at which the linear RF multipole electric field is substantially at 0, which shows the position for a tungsten filament constituting an electron source that generates electrons to be entered to the ion source section. A sample gas introduction pipe for flowing a sample gas to the ion source section and a reagent gas introduction pipe for flowing a reaction gas (reagent gas) used for the ion creating reaction to the ion source are not illustrated for the sake of simplicity.

Figure 2:
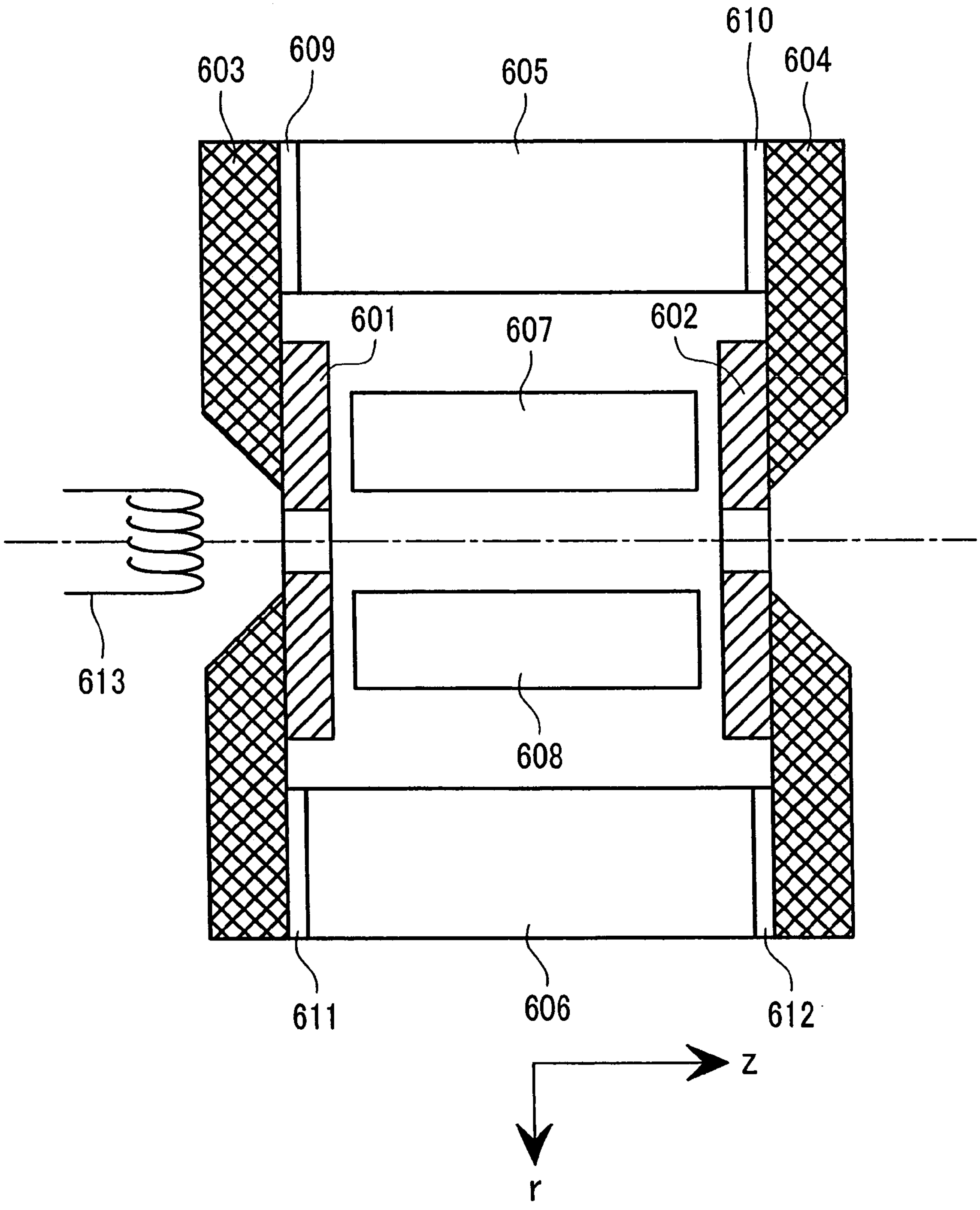
FIG. 2 is a view for explaining a first example of a constitution of an ion source section in Embodiment 1 of the invention.

FIG. 2 is a view for explaining a first example of the ion source section constitution in the embodiment of the invention that shows linear multipole electrodes 607 and 608 (two of multipole. electrodes constituted with 4 or more electrode rods are shown), plate-like permanent magnets 601 and 602 coated at the surface with metal or covered at the surface with a metal, magnetic bodies 603, 604, 605, and 606, insulators 609, 610, 611 and 612 for electrically insulating the magnetic bodies 603, 603, 604, and 604 from each other thereby electrically insulating the two permanent magnets from each other and a tungsten filament 613 constituting an electron source.

The direction of magnetization of the two permanent magnets 604 and 602 is in the direction z which is normal to the plate. The two permanent magnets 604 and 602 are placed such that the direction of the magnetic force lines of static magnetic fields are in parallel with the direction z. Thus, magnetic fields parallel with the center axis (axis z) for the linear multipole electrodes 607 and 608 are applied to the inside of the multipole electrodes. The mass spectrometric section is placed in the direction z on the side of the magnet 604.

Figure 3:
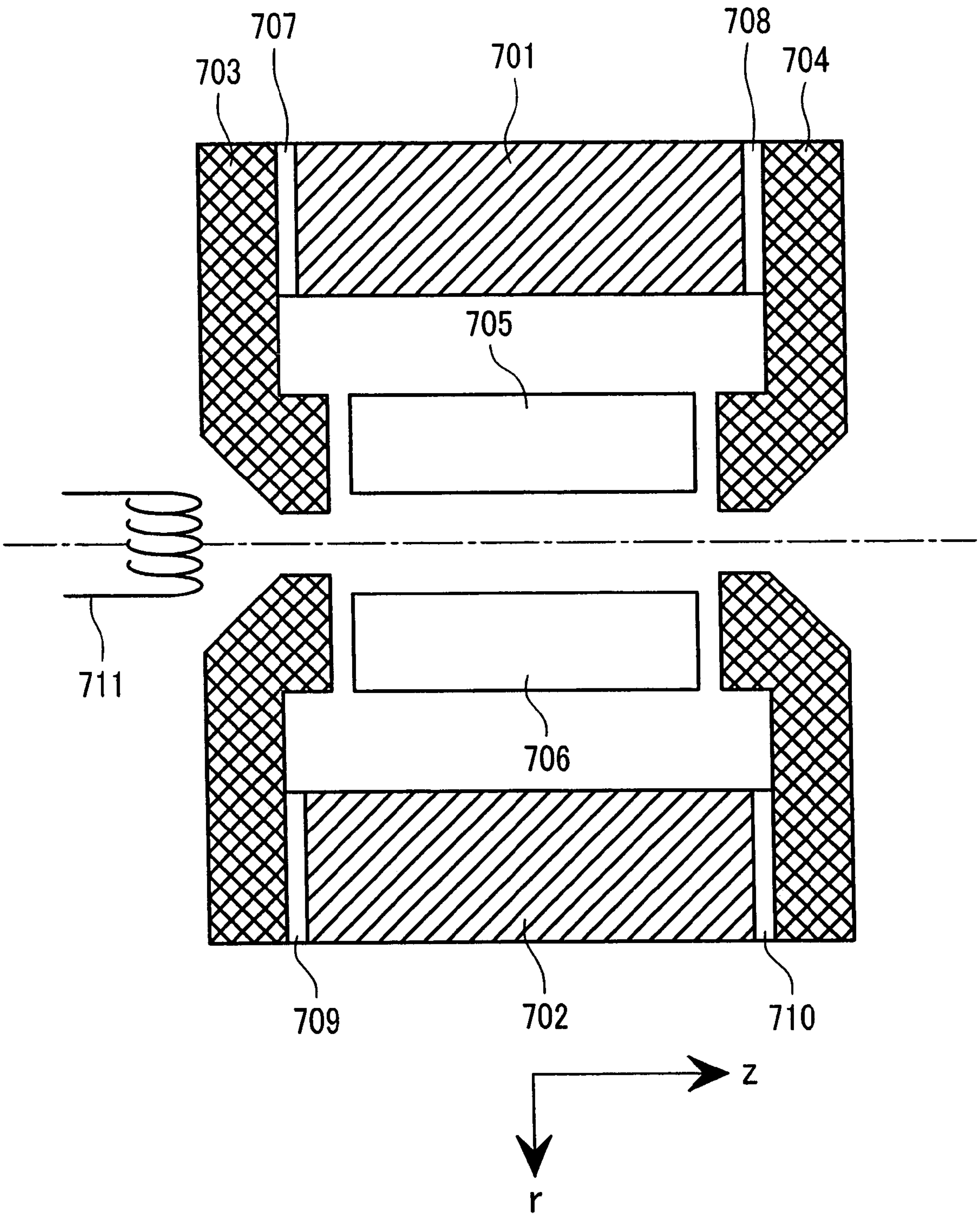
FIG. 3 is a view for explaining a second example of a constitution of an ion source section in the embodiment of the invention.

FIG. 3 is a view for explaining a second example for the constitution of the ion source section in this embodiment of the invention which shows linear multipole electrodes 705 and 706, and shows linear multipole electrodes 705, 706 (showing two multipole electrodes constituted with four or more electrode rods), plural rod-shape permanent magnets 701 and 702 (showing two out of plural of them), magnet 703 and 704 constituting a magnetic circuit including magnetic poles, insulators 707, 708, 709, and 710 electrically insulating plural permanent magnets 701 and 702 and magnetic bodies 703 and 704 from each other, thereby electrically insulating two magnetic poles of plural permanent magnets 701 and 702 from each other, and a tungsten filament 711 for constituting the electron source.

The plural permanent magnets 701 and 702 are placed such that each of the direction of magnetization of plural permanent magnets is in parallel with the direction z. Thus, magnetic fields in parallel with the center axis (axis z) of the linear multipole electrodes 705 and 706 is applied to the inside of the linear multipole electrode. A single magnet may be used instead of plural rod-shaped permanent magnet. The mass spectrometric section is disposed in the direction z on the side of the magnetic body 704.

Figure 4:
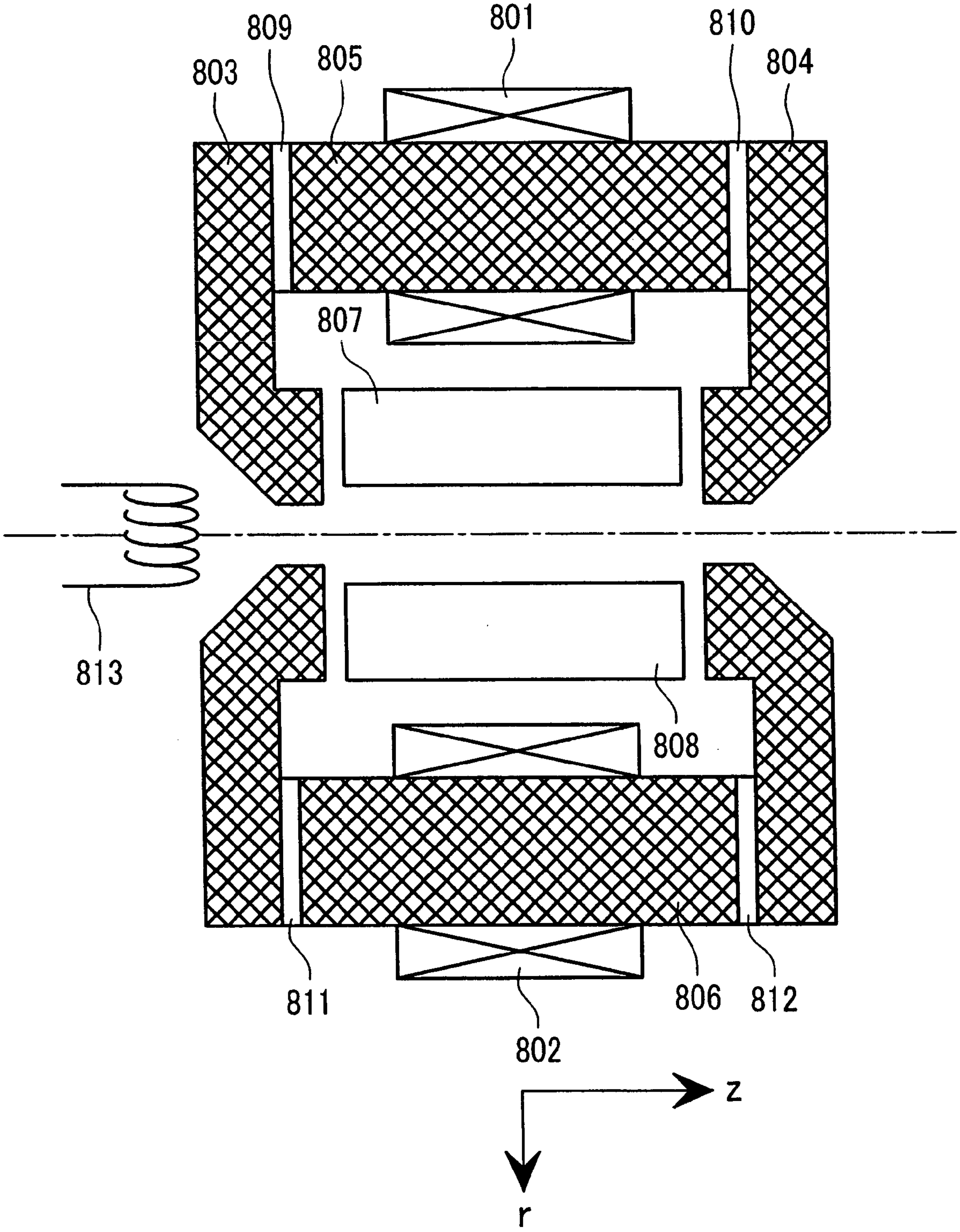
FIG. 4 is a view for explaining a third example of a constitution of an ion source section in the embodiment of the invention.

FIG. 4 is a view for explaining a third example of an ion source section in the embodiment of the invention that shows linear multipole electrodes 807 and 808 (showing two of multipole electrodes constituted with four or more electrode rods), coils 801 and 802 constituting two electromagnets, insulators 809, 810, 811, and 812 for electrically insulating cores 805 and 806 of electromagnets and magnetic poles 803 and 804 from each other and a tungsten filament 813 constituting an electron source.

The two electromagnets are placed such that each of the direction of magnetization of the two electromagnets is in parallel with the direction z. Thus, magnetic fields in parallel with the center axis (axis z) of the multipole electrodes 807, 808 are applied to the inside of the multipole electrodes. The mass spectrometric section is placed in the direction z on the side of the magnetic pole 804.

Figure 5:
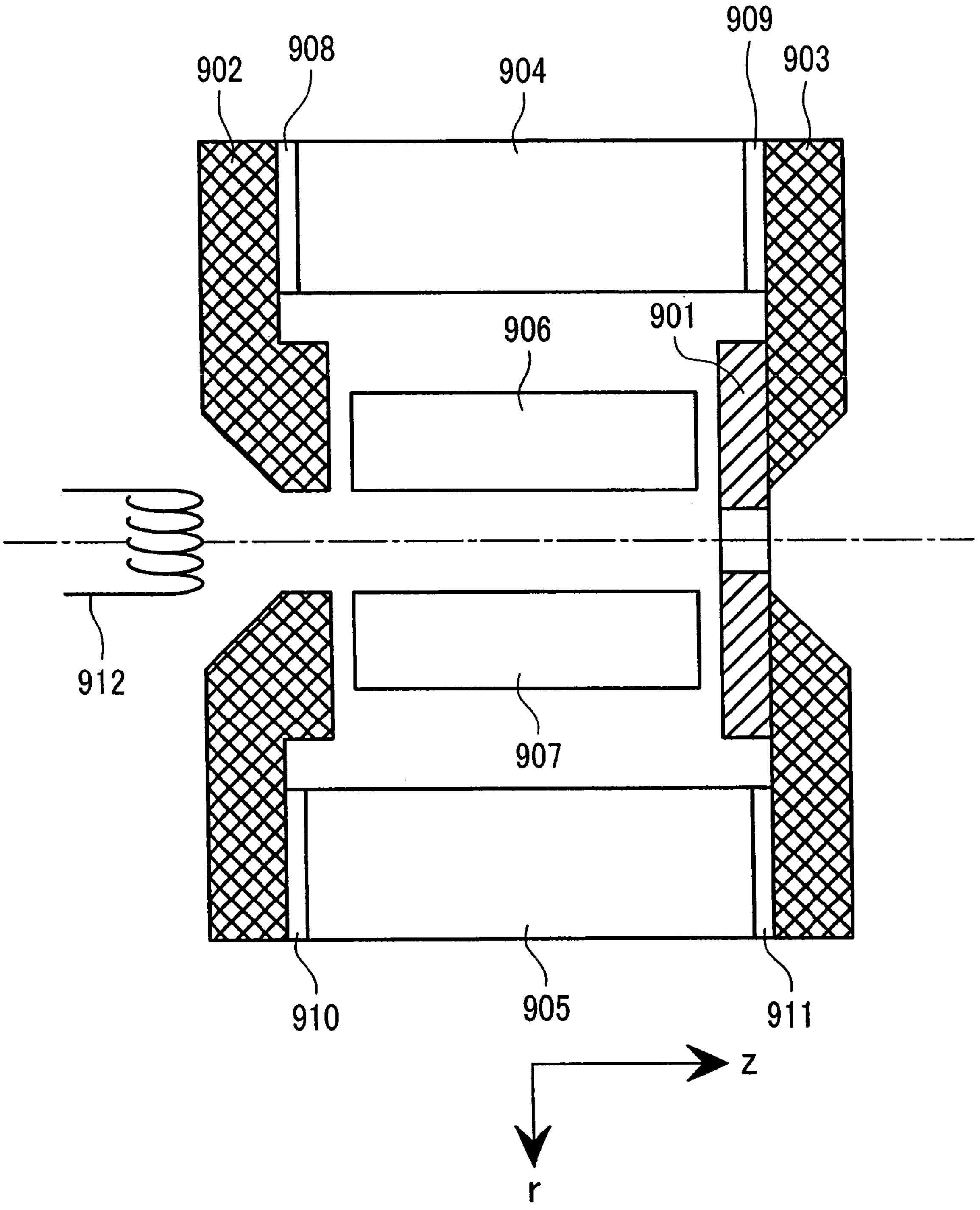
FIG. 5 is a view for explaining a fourth example of a constitution of an ion source section in the embodiment of the invention.

FIG. 5 is a view for explaining fourth example of the ion source section in the embodiment of the invention that shows linear multipole electrodes 906, 907 (showing two of multipole electrodes constituted with four or more electrode rods), a plate-like permanent magnet 901 formed with an aperture for allowing ions to pass therethrough and coated at the surface with a metal or covered at the surface with a metal, magnetic circuits 902, 903, 904, 905, insulators 908, 909, 910, and 911 for electrically insulating the magnetic circuit 902, 903, 904, and 905, and a tungsten filament 912 constituting an electron source.

The permanent magnet 901 is magnetized parallel with the direction Z. Thus, magnetic fields inside of the multipole electrodes is parallel with the center axis (z) for the multipole electrodes 906, 907. The tungsten filament 912 is plaeced on the side opposite to the permanent magnet 901. The mass spectrometric section is placed in the direction z on the side of the pole piece 903.

Embodiment 2

Figure 6:
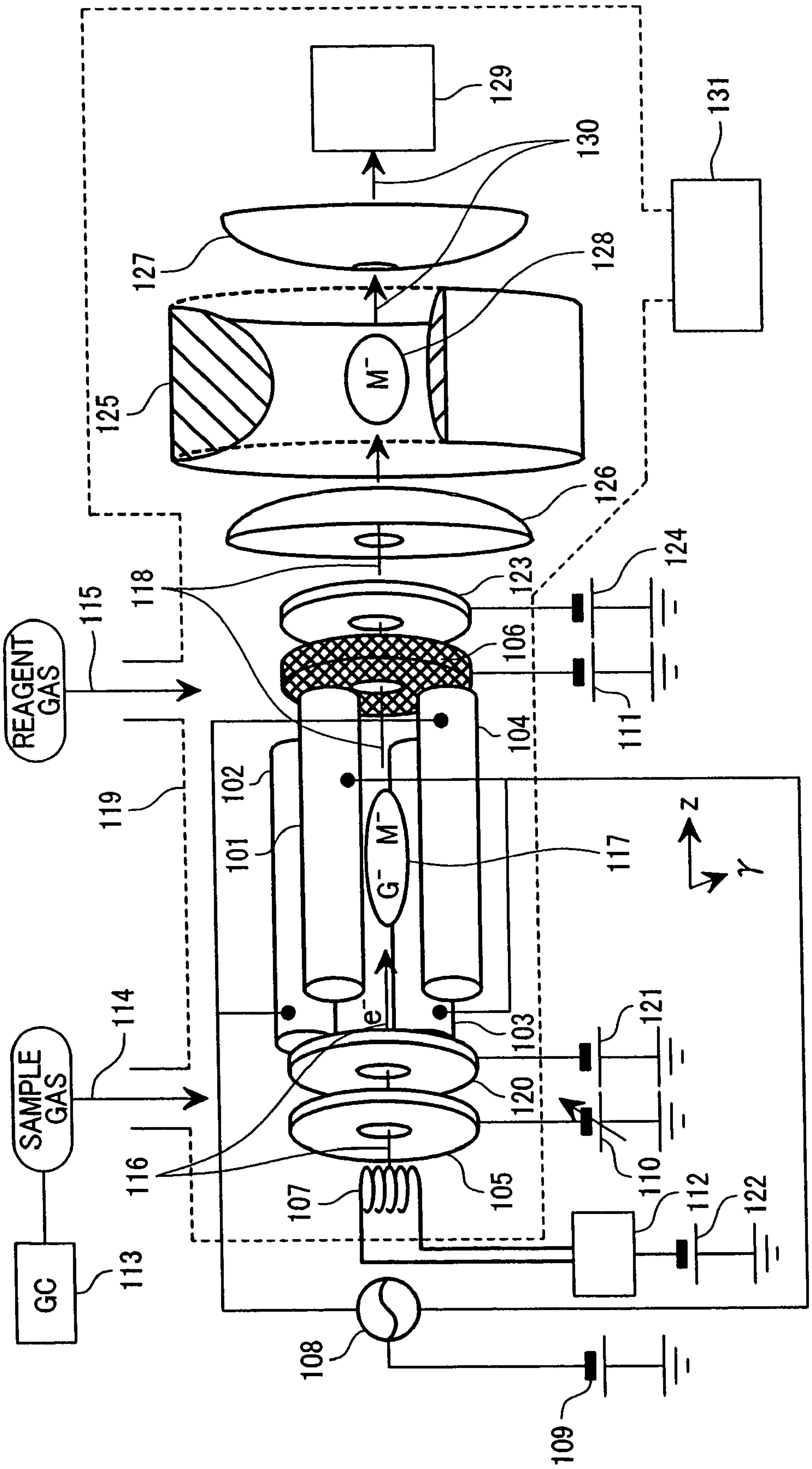
FIG. 6 is a view for explaining a constitution of a mass spectrometer of Embodiment 2 according to the invention.

FIG. 6 is a view for explaining the constitution of a mass spectrometer in Embodiment 2 of the invention.

The mass spectrometer in Embodiment 2 shown in FIG. 6 has an ion source section for conducting negative chemical ionization, in which an ion source section having a structure of the fourth example shown in FIG. 5 is used as the ion source section. The ion source section placed inside a vacuum vessel 119 pumped by a vacuum pump 131 is comprised of a tungsten filament 107 constituting an electron source, a gate electrode 105 for controlling electron introduction having an aperture for allowing electrons to pass therethrough, an electron introduction port electrode 120 having an aperture for allowing the electrons to pass therethrough, linear quadrupole electrodes 101, 102, 103, and 104 forming a quadrupole structure, a permanent magnet 106 formed with an aperture for allowing ions to pass therethrough and coated with a metal, and an ion drawing-out electrode 123 formed with an aperture for allowing ions to pass therethrough.

The linear quadrupole electrodes 101, 102, 103, and 104 are applied with an RF voltage by an RF power source 108 and a DC bias voltage by a power source 109, respectively, to form linear RF multipole electric fields. The tungsten filament 107 is connected with a current source 112 for driving the tungsten filament and a bias power source 122, and electrons are emitted from the tungsten filament 107 to form an electron beam 116.

A voltage is applied by a voltage source 110 for biasing the gate electrode, and introduction of electrons of the electron beam 116 to the space where the linear RF multipole electric fields are generated is controlled by the gate electrode 105 having the aperture allowing the electrons to pass therethrough for controlling the introduction of electrons and by the electron introduction port electrode 120 driven by the voltage source 121 for biasing the electron introduction port electrode and having the aperture for allowing the electrons to pass through.

A voltage is applied by a voltage source 111 for biasing the permanent magnetic. Ions are moved from the space to the mass spectrometric section by the metal coated on the permanent magnetic 106 formed with the aperture for allowing ions to pass therethrough and, the ion drawing-out electrode 123 applied with the voltage by using the power source 124 for biasing ion drawing-out electrode.

A reagent gas (flow of reagent gas is shown by an arrow 115) is caused to flow by way of a reagent gas introduction pipe and a sample gas separated by a gas chromatograph 113 (flow of sample gas is shown by an arrow 114) are caused to flow by way of a sample gas introduction pipe to the inside of the ion source section inside the vacuum vessel 119. In the space where the linear RF multipole electric fields are generated inside the ion source section, negative ions $M^-$ of the sample molecules M are created as has been descried previously for Embodiment 1 according to formulae (3) and (4).

The molecule G of the reagent gas 115 introduced into the space captures a electron $e^+$ at a low speed derived from the electrons emitted from the tungsten filament 107 to create primary negative ion $G^-$. By the chemical ionization reaction between the created primary ion $G^-$ and the sample molecule M of the sample gas flow 114 creates a sample ion $M^-$. The created sample ion $M^-$ is moved by the ion drawing-out electrode 123 driven by the power source 124 for biasing the ion extraction electrode as a flow of the sample ion $M^-$ (shown by an arrow 118) to the mass spectrometric section comprising a three-dimensional ion trap disposed in the identical vacuum vessel 119.

The three-dimensional ion trap comprises a ring electrode 125 and end cap electrodes 126 and 127. The sample ion $M^-$ 128 moved to and captured in the inside of the three dimensional ion trap is discharged as a flow of the sample ion $M^-$ 128 (shown by arrow 130) in a mass selective manner from the three dimensional ion trap and introduced to and detected by an ion detector 129.

Since the constitution for each of the portions of the three-dimensional ion trap, the driving power source to be applied to each of the portions are well-known description therefore is to be omitted.

Description is to be made to the application of the voltage to the linear quadrupole electrodes 101, 102, 103 and 104 of the ion source section in Embodiment 2. By the application of the voltage to the linear quadrupole electrodes 101, 102, 103, and 104, an ion trapping potential is formed by linear RF quadrupole electric fields. The principle for ion capture by the linear RF quadrupole electric fields is identical with the principle for ion capture in the linear ion trap.

Assuming the amplitude at the position of an electrode spaced by $r_0$ from the center axis as $V_{rf}$, the frequency as Ω and e as the unit charge, the parameter q describing the stable condition of an ion having a charge-mass ratio m/z in the linear RF quadrupole electric fields is given by the following equation:

$$q=4(z/m)eV_{rf}/(r_0\,\Omega)^2 \quad \text{(equation 1)}$$

In a case where the relation: $q \leqq 0.907$ is satisfied, ions having the mass-to-charge ratio m/z are stably stored in the linear RF quadrupole eclectic fields.

In this invention, it is necessary that the primary ion $G^-$ (such as negative ion of water : $H_2O$_) generally of low mass and the sample ion $M^-$ (charge-mass ratio m/z of typically 10 to 1000) are trapped simultaneously in the linear RF quadrupole electric fields stably. Generally, since the primary ion $G^-$ has smaller charge mass ratio compared with the sample ion $M^-$, $V_{rf}$ as high as possible within a range for q capable of satisfying the stable condition is applied. That is, in a case of adopting water $H_2O$ as a reagent gas G, for instance, the RF amplitude $V_{rf}$ is determined so as to give a value q as large as possible within a range of from 0.8 to 0.907 relative to the negative ion of water $H_2O$ having the charge-mass ratio of 18.

Figure 7:
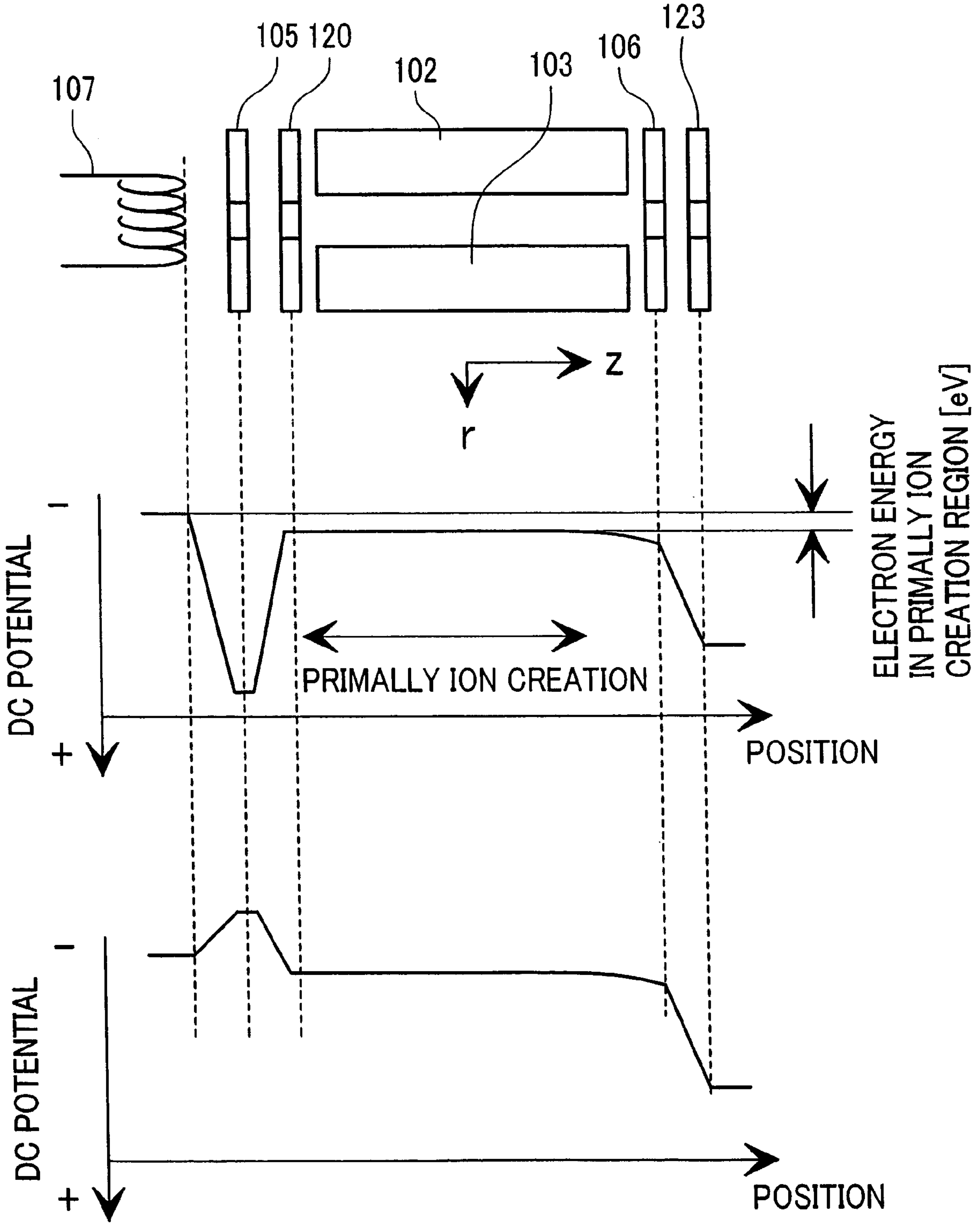
FIG. 7 is a view for explaining a DC voltage applied to each of electrodes of an ion source section in Embodiment 2 of the invention.

FIG. 7 is a view for explaining a DC voltage applied to each of electrodes of the ion source section in Embodiment 2 of the invention. In FIG. 7, the abscissa represents the position in the direction z and the ordinate represents the DC potential in the ion source section.

Since the potential of the end cap electrode 126 and 127 of the three-dimensional ion trap is generally set to the ground potential, the following description is to be made assuming that the potential of the end cap electrode 126 and 127 is at the ground potential.

At first, the DC voltage is applied to each of the electrodes during the ion introduction period where the negative sample ions are created , and the sample ions are introduced to the mass spectrometric section (the period is also the ion creation period). The DC bias voltage applied to the linear quadrupole electrodes 101 to 104 is set negative by using the voltage source 109 for biasing the linear quadrupole electrode. This introduces the created negative sample ions to the ion trap mass spectrometric section. In this case, for avoiding electron impact ionization or creation of positive ions by positive chemical ionization in the ion trap by the electrons reaching the ion trap mass spectrometric section, the DC bias voltage is set to about 20 V or lower.

In the case of negative chemical ionization, since the kinetic energy of electrons in the primary ion creation region inside the linear quadrupole electrodes 101 to 104 (electron energy) is determined by the potential difference of the bias between the tungsten filament 107 and the bias for the linear quadrupole electrode, a positive bias at about 1V or lower relative to the linear quadrupole electrodes 101 to 104 is applied to the tungsten filament 107 by using the bias power source 122 for the tungsten filament.

In the case of positive chemical ionization and electron impact ionization, by using the voltage source 110 for biasing the gate electrode, a positive bias relative to the tungsten filament 107, typically, a bias at about 10V to 100V is applied to the gate electrode 105 for controlling the electron introduction having the aperture for allowing the electrons to pass therethrough disposed between the tungsten filament 107 and the linear quadrupole electrodes 101 to 104.

Due to the potential difference between the tungsten filament 107 and the gate electrode 105 for controlling the electron introduction having the aperture for allowing the electrons to pass through, thermal electrons generated from the tungsten filament 107 are drawn out and introduced as an electron beam 116 to the inside of the linear quadrupole electrodes 101 to 104.

Since the potential within ±1V relative to the potential applied to the linear quadrupole electrodes 101 to 104 is applied to the electron introduction electrode 120 having the aperture for allowing the electrons to pass therethrough by using the voltage source 121 for biasing the electron introduction port electrode, the electron introduction port electrode 120 having the aperture for allowing the electrons to pass therethrough has a role of a shield electrode that inhibits the effect of the voltage applied to the gate electrode having the aperture for electrons to pass therethrough for controlling the electron introduction from reaching the inside of the linear quadrupole electrodes 101 to 104.

By using the voltage source 111 for biasing the permanent magnet, a potential equal with or slightly positive relative to the potential applied to the linear quadrupole electrodes 101 to 104 is applied to the metal coated on the permanent magnet 106 formed with the aperture for allowing ions to pass therethrough. The permanent magnet 106 formed with the aperture for allowing ions to pass therethrough corresponds to the take out port electrode for negative sample ions. Further, by using the power source 124 for biasing the ion drawing-out electrode, a voltage which is more positive than the voltage applied to the metal coated on the permanent magnet 106 formed with the aperture for allowing ions to pass therethrough is applied to the ion drawing-out electrode 123.

Thus, the flow of the sample ions M-117 (shown by arrow 118) is discharged from the linear quadrupole electrodes 101 to 104 and introduced to the inside of the ion trap mass spectrometric section 125 to 127. That is, the ion ejection electrode 123 has an effect of ejecting the sample ion $M^-$ from the ion source section, as well as an effect of a lens that optimizes the efficiency of introducing the sample ion $M^-$ to the ion trap mass spectrometric section 125 to 127.

Further, for avoiding that the electron beam 116 of the electrons generated from the tungsten filament 107 reach as far as the ion trap section 125 to 127 and the ion detector 129 to cause noises in the ion spectrum for measurement of the sample ion $M^-$, it is desirable to interrupt the electron beam 116 during the period where the ion trap mass spectrometric sections 125 to 127 conduct mass spectrometry (mass spectrometry period). Accordingly, during the mass spectrometry period for the sample ion $M^-$, the voltage for the gate electrode 105 having the aperture for allowing the electrons to pass therethrough for controlling the electron introduction is set to a large negative value as shown in FIG. 7, and this can prevent the electrons generated from the tungsten filament 107 from being introduced to the ion source section, the mass spectrometric section or the ion detector 129.

As has been described above, it is desirable that the electron beam 116 is introduced to the space where the linear RF multipole electric field are generated to create the sample ion $M^-$ and introduce the same to the mass spectrometric section during the period of introducing ions to the mass spectrometric section (the period is also the ion creation period), whereas the electrons 116 do not reach the mass spectrometric section during the mass spectrometry period by conducting operation under synchronization between the mass spectrometric section and the ion source section, in accordance with the operation timing of the mass spectrometric section.

Generally, molecules of water are often used as a reagent gas for negative chemical ionization but it will be apparent that the control and the operation for each of the portions of the ion source section and the mass spectrometric section described previously are applicable to all sorts of reagent gases in the same manner as in Embodiment 1.

As described above, since the Embodiment 2 is constituted such that the electric field gradient is not provided in the direction of the center axis where the linear converging potential formed by the linear RF quadrupole electric fields is substantially at 0, the efficiency for utilizing the created sample ions is 50% with a probabilistic point of view. Accordingly, as described previously, Embodiment 2 is inferior to Embodiment 3 of the invention to be described later.

However, since the constitution of the apparatus is simple, it has an advantage of reduced cost in view of the simplicity and convenience, and the reduced cost as described previously. Then, it is considered that the mass spectrometer of the constitution in Embodiment 2 using the three-dimensional RF ion trap is important, as well as the mass spectrometer of the constitution in Embodiment 3 to be described next.

Figure 8:
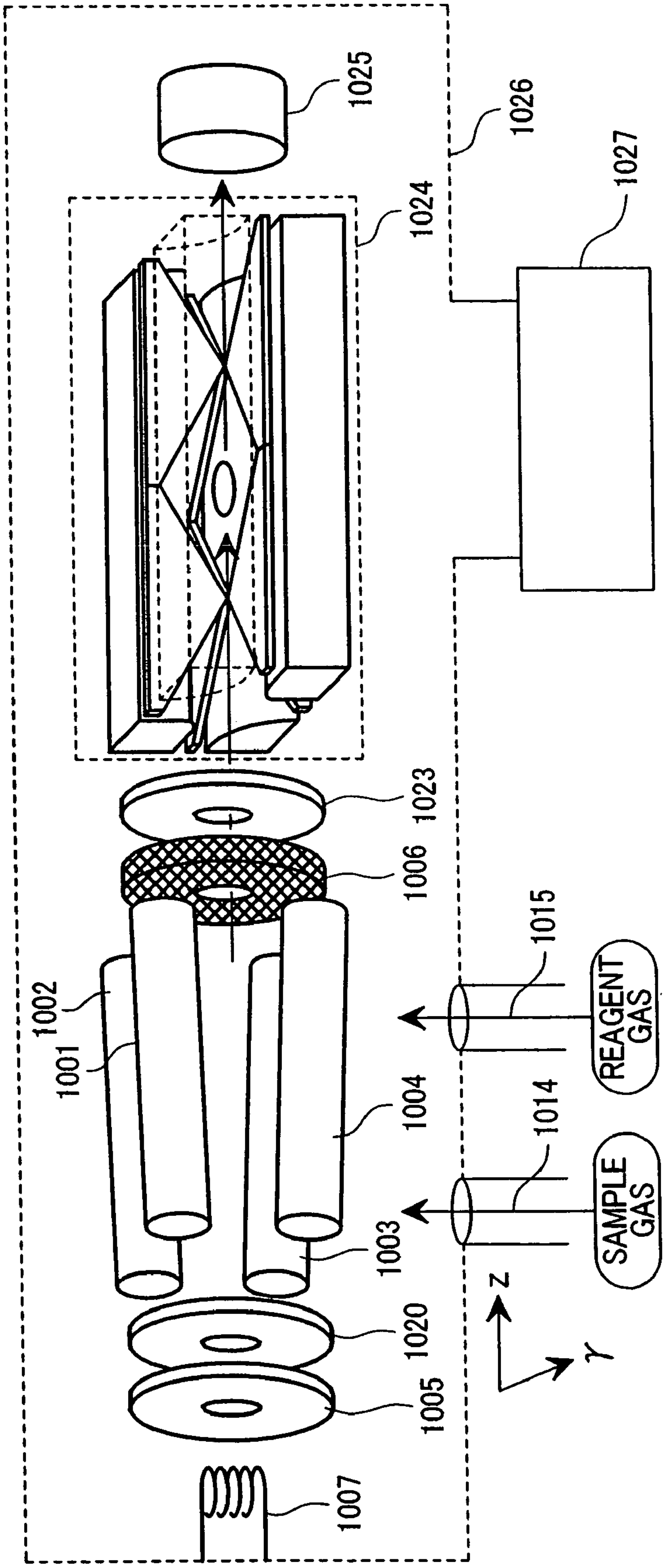
FIG. 8 is a view for explaining the constitution of a mass spectrometer of Embodiment 3 according to the invention.
Figure 9:
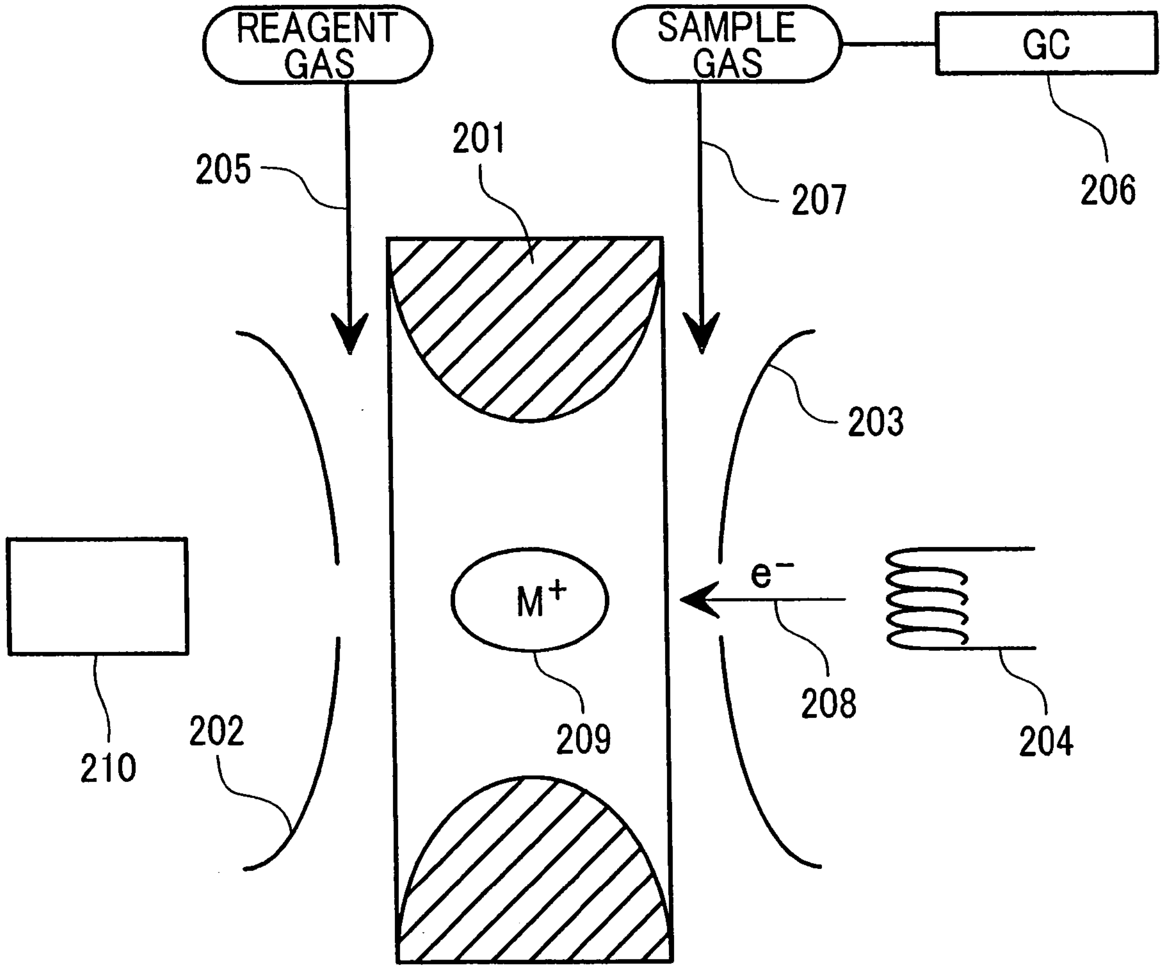
FIG. 9 is a view for explaining the outline of a mass spectrometer in the prior art in which an ion source section for positive chemical ionization and a mass spectrometric section are used in common.
Figure 10:
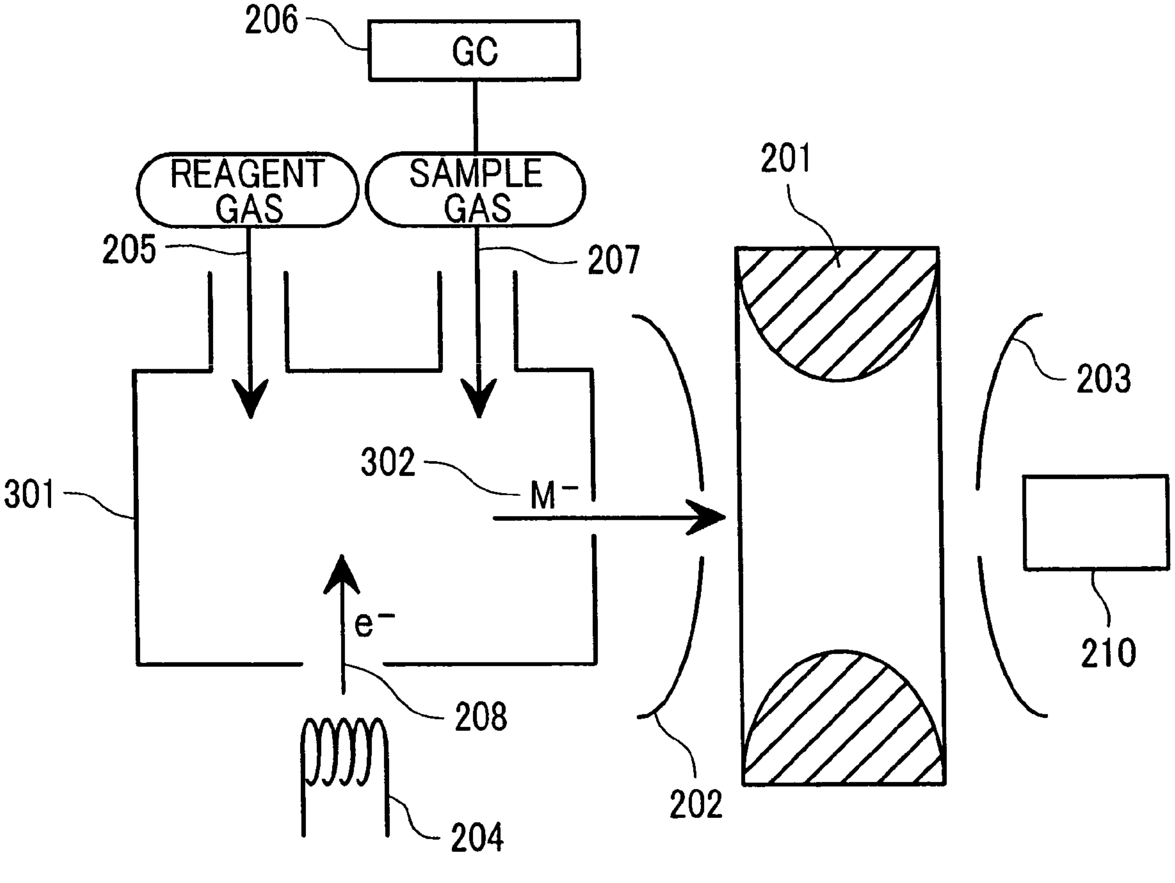
FIG. 10 is a view for explaining the outline of a mass spectrometer in the prior art having an external ion source section for conducting negative chemical ionization.

FIG. 8 is a view for explaining the constitution of a mass spectrometer in Embodiment 3 of the invention which has higher sensitivity than the mass spectrometer of Embodiment 2.

Embodiment 3 has a constitution of providing an electric field gradient in the direction of a center axis where the linear trapping potential formed by the linear RF multipole electric fields is substantially at 0, and since it is constituted to improve the efficiency of transporting sample ions not in the direction where the electron source 403 situates but to the side where the mass spectrometric section 412 situates, this enables mass spectrometry by negative chemical ionization at high sensitivity.

Embodiment 3

The mass spectrometer in Embodiment 3 shown in FIG. 8 has an ion source section for conducting negative chemical ionization in which an ion source section of a structure of the fourth example shown in FIG. 5 is used as the ion source section in the same manner as in Embodiment 2. The ion source section placed inside a vacuum vessel 1026 pumped by a vacuum pump 1027 comprises a tungsten filament 1007 constituting an electron source, a gate electrode 1005 having an aperture for allowing electrons to pass therethrough for controlling electron introduction, an electron introduction port electrode 1020 having an aperture for allowing electrons to pass through, linear quadrupole electrodes 1001, 1002, 1003, and 1004 formed not in parallel for forming a quadrupole structure, a permanent magnet 1006 formed with an aperture for allowing ions to pass through and coated with a metal, and an ion ejection electrode 1023 formed with an aperture for allowing ions to pass therethrough.

A reagent gas (flow of reagent gas is shown by allow 1015) is sent by way of a reagent gas introduction pipe and a sample gas separated from a not illustrated gas chromatograph (flow of sample gas is shown by arrow 1014) is sent by way of a sample gas introduction pipe to the inside of the ion source section inside the vacuum vessel 1026. In the space where the linear RF multipole electric fields are generated inside the ion source section, negative ion $M^-$ of the sample molecule M is created, in the same manner as explained for Embodiment 2 previously in accordance with formulae (3) and (4).

The molecule G of the reagent gas 1015 introduced into the space captures an electron $e^-$ at a low speed derived from the electron generated by the tungsten filament 1007 to create a primary negative ion $G^-$. A sample ion $M^-$ is created by the chemical ionization reaction between the created primary ion $G^-$ and the sample molecule M of the sample gas flow 1014.

The created sample ion $M^-$ is moved by the ion ejection electrode 1023 formed with an aperture for allowing ions to pass through and driven by a power source for biasing the ion ejection electrode not illustrated as a flow of the sample ion $M^-$ to an axial resonance discharge type ion trap mass spectrometric section 1024 which is placed in the identical vacuum vessel 1026 as an embodiment of the linear ion trap mass spectrometric section. The sample ion $M^-$ moved to and captured in the axial resonance discharge type ion trap mass spectrometric section 1024 is discharged from the inside of the axial resonance ejection type ion trap mass spectrometric section 1024 in a mass selective manner, and introduced as a flow of the sample ion $M^-$ into and detected by the ion detector 1025.

Since, application of the voltage for driving each of the electrodes of the ion source section of the mass spectrometer in Embodiment 3 is identical with the application of the voltage for driving each of the electrodes of the ion source section of the mass spectrometer in Embodiment 2 shown in FIG. 6, descriptions there for are to be omitted. Further, since the driving power source, etc. to be applied to each of the portions of the axial resonance ejection type ion trap mass spectrometric section 1024 are well-known, descriptions therefor are to be omitted.

Since Embodiment 1 and Embodiment 2 described previously are constituted so as not to provide the gradient of electric fields in the direction of the center axis where the linear trapping potential formed by the linear RF multipole electric fields is substantially at zero, the efficiency of utilizing the created sample ions is 50% with a probabilistic point of view. That is, it is highly plausible that 50% of the sample ions is introduced to the mass spectrometric section and remaining 50% of them is moved to the electron source and lost with the probabilistic point of view.

For Embodiment 3, description is to be made to a method capable of avoiding such loss of ions as much as possible and conducting mass analysis at high efficiency. In Embodiment 3, a linear ion trap mass spectrometer utilized generally as a mass spectrometric section in recent years is used. Since the ion capturing efficiency of the linear ion trap mass spectrometer has a higher value of about 100% when compared with the ion capturing efficiency of the three dimensional ion trap mass spectrometer (typically at 10%), it is preferred for analysis at a high sensitivity.

While the linear ion trap axial resonance ejection system described in the existent example described previously (Patent Document 5) is adopted in Embodiment 3, the linear ion trap mass spectrometric system as in the existent examples (Patent Documents 3, 4) described above is also applicable in Embodiment 3.

As shown in FIG. 8, linear RF quadrupole electrodes 1001 to 1004 constituting the ion source section in Embodiment 3 are arranged such that the size of the opening formed in the cross section vertical to the direction z of the linear RF quadrupole electrodes 1001 to 1004 is gradually enlarged toward the aperture formed in the permanent magnet 1006 coated with the metal for allowing the ions to pass therethrough and the aperture formed in the ion drawing-out electrode 1023 for allowing the ions to pass therethrough (that is, in the direction z).

With the arrangement of the linear RF quadrupole electrodes 1001 to 1004, more strong linear RF quadrupole electric fields are formed at a position nearer to the tungsten filament 1007 constituting the electron source, while less strong linear RF quadrupole electric fields are formed at a position nearer to the axial resonance discharge type ion trap mass spectrometric section 1024 at the inside of the linear RF quadrupole electrodes 1001 to 1004. Accordingly, a force from the tungsten filament 1007 constituting the electron source to the axial resonance ejection type ion trap mass spectrometric section 1024 exerts on the ions captured inside the linear RF quadrupole electrodes 1001 to 1004. That is, the ions tend to move toward the axial resonance ejection type ion trap mass spectrometric section 1024. As a result, the introduction efficiency of the ions to the axial resonance discharge type ion trap mass spectrometric section 1024 is improved.

The existent example (Patent Document 6) described previously refers to the technique of placing the linear RF generating multipole electrode not in parallel thereby introducing the ions to the open side but this aims at the improvement of the ion transmission efficiency of the ion guide placed between the ion source section and the mass spectrometric section. The existent example does not refer to the use of the linear RF generating multipole electrodes arranged not in parallel as the constituent element of the ion source section that conduct chemical ionization of a sample gas under the application of magnetic fields as in Embodiment 3 of the present invention.

Since the control and the operation for each of the portions of the ion source section and the mass spectrometric section in Embodiment 1 and Embodiment 2 are applicable in the same manner to Embodiment 3, descriptions are to be omitted for the control and the operation for each of the portions of the ion source section and the mass spectrometric section in Embodiment 3.

The constitution of Embodiment 3 is different from that of Embodiment 2 in that the axial resonance ejection type ion trap mass spectrometric section is used as one of embodiments of the linear ion trap mass spectrometric sections as the mass spectrometric section, and the linear RF generating multipole electrodes arranged not in parallel are used as the constituent element of the ion source section, and the constitution of Embodiment 3 can provide a remarkable effect capable of providing a mass spectrometer that can attain a high sensitivity.

As has been described above specifically, the present invention can provide a mass spectrometer having an ion source section capable of creating positive ions and negative ions at a high efficiency and capable of detecting ions at a high sensitivity and can provide a great industrial applicability.

What is claimed is:

1. A mass spectrometer comprising an ion source for creating ions for a sample ions, a mass spectrometric section for conducting mass separation of ions, linear RF generating multipole electrodes for generating RF multipole electric fields, magnetic field generation means for generating static magnetic fields to be superimposed substantially in parallel on a center axis, reaction gas introduction system for introducing the reaction gas to the inside of the ion source, and an electron source for generating electrons to be used for the creating reaction of the ions, in which the linear RF generating multipole electrodes, the magnetic field generating means and the electron source are placed inside the ion source.

* * * * *

UNITED STATES PATENT AND TRADEMARK OFFICE

CERTIFICATE OF CORRECTION

PATENT NO. : 7,397,025 B2

APPLICATION NO. : 11/517334
DATED : July 8, 2008
INVENTOR(S) : Baba et al.

It is certified that error appears in the above-identified patent and that said Letters Patent is hereby corrected as shown below:

On the face of the patent, Under Item (*) Notice, please ADD:

This patent is subject to a terminal disclaimer.

Signed and Sealed this

Seventh Day of October, 2008

JON W. DUDAS
*Director of the United States Patent and Trademark Office*